United States Patent
Cheng et al.

(10) Patent No.: US 8,884,574 B2
(45) Date of Patent: Nov. 11, 2014

(54) POSITIONING METHOD AND POSITIONING DEVICE (71) Applicant: Shenzhen China Star Optoelectronics Technology Co., Ltd., Guangdong (CN)

(72) Inventors: Wen-da Cheng, Gunagdong (CN); Chujen Wu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 129 days.

(21) Appl. No.: 13/811,389

(22) PCT Filed: Dec. 26, 2012

(86) PCT No.: PCT/CN2012/087470
§ 371 (c)(1),
(2), (4) Date: Jan. 22, 2013

(87) PCT Pub. No.: WO2014/094327
PCT Pub. Date: Jun. 26, 2014

(65) Prior Publication Data
US 2014/0176038 A1 Jun. 26, 2014

(30) Foreign Application Priority Data
Dec. 20, 2012 (CN) .......................... 2012 1 0559208

(51) Int. Cl.
*G05B 1/06* (2006.01)
*G01B 11/06* (2006.01)
*G02B 7/30* (2006.01)

(52) U.S. Cl.
CPC .............. *G01B 11/0608* (2013.01); *G02B 7/30* (2013.01)
USPC ......................................................... 318/640

(58) Field of Classification Search
CPC ............................................... G01B 2003/1092
USPC ......................................................... 318/640
See application file for complete search history.

(56) References Cited

U.S. PATENT DOCUMENTS

| | | | |
|---|---|---|---|
| 2005/0242286 A1* | 11/2005 | Watanabe et al. | 250/310 |
| 2006/0060781 A1* | 3/2006 | Watanabe et al. | 250/310 |
| 2007/0017111 A1* | 1/2007 | Hoback et al. | 33/771 |
| 2011/0317172 A1* | 12/2011 | Tamiya | 356/614 |
| 2014/0175302 A1* | 6/2014 | Touya et al. | 250/398 |

* cited by examiner

Primary Examiner — Erick Glass (57) ABSTRACT

The present disclosure provides a positioning method and a positioning device. The positioning device includes: an emitter for emitting light beams to a to-be-positioned point and auxiliary positioning points; a receiver for receiving reflected light beams reflected by the to-be-positioned point and the auxiliary positioning points; a judging module for judging whether the reflected light beam reflected by the to-be-positioned point is received or not; and a calculating module for receiving a judging result from the judging module and determining height information of the to-be-positioned point according to the reflected light beams reflected by the to-be-positioned point and the auxiliary positioning points. Thus, the height information of the to-be-positioned point can be determined according to the reflected light beams reflected by the auxiliary positioning points even if the reflected light beam reflected by the to-be-positioned point cannot be received, which improves the success rate of the positioning.

13 Claims, 3 Drawing Sheets

POSITIONING METHOD AND POSITIONING DEVICE

BACKGROUND

1. Technical Field

The present invention relates to positioning technologies and, particularly, to a positioning method and positioning device applied in the manufacturing process of a liquid crystal panel.

2. Description of Related Art

In the manufacturing process of the Thin Film Transistor (TFT) array substrate, in order to guarantee the quality of the TFT array substrate, the width of the signal line of the TFT array substrate has to be measured. At present, before the signal line of the array substrate is measured, a laser positioning device is generally adopted to position the TFT array substrate, so the width measure device can obtain clear pictures to improve the accuracy of the measurement is improved.

At present, when the Laser positioning device is positioning the TFT array substrate, a laser emitter of the laser positioning device emits a light beam to a predetermined to-be-positioned point on the TFT array. The light beam is then reflected by the predetermined point to form a reflected light beam and is received by a receiver of the positioning device. The positioning device determines height information of the to-be-positioned point according to the received reflected light beam, and then adjusts the height of the TFT array substrate according to the height information of the to-be-positioned point, which allows the TFT array substrate to be located at a height suitable for the measurement thereof carried out by the height thereof.

However, during the positioning, the surface of the TFT array substrate already is rough due to a number of elements formed thereon, and impurities may exist on the TFT array substrate surface. If the area of the surface corresponding to the to-be-positioned point is rough or have the impurities covered thereon, the light beam from the laser emitter will be scattered at the positioning point. In this condition, the reflected light beam may be projected to a position outside the receiving scope of the receiver. As such, the receiver cannot receive the reflected light beam from the positioning point, resulting in failure of the positioning.

SUMMARY

The main object of the present invention is to provide a positioning method and positioning device, designed to improve the success rate of positioning.

The positioning method provided in the present disclosure includes:

emitting light beams to a to-be-positioned point and a number of auxiliary positioning points;

receiving reflected light beams of the emitted light beams reflected by the to-be-positioned point and the auxiliary positioning points;

judging whether the reflected light beam reflected by the to-be-positioned point is received or not;

if the reflected light beam reflected by the to-be-positioned point is received, determining height information of the to-be-positioned point according to the reflected light beam reflected by to-be-positioned point or the reflected light beams reflected by the auxiliary positioning points; and if the reflected light beam reflected by the to-be-positioned point is not received, determining the height information of the to-be-positioned point according to the reflected light beams reflected by the auxiliary positioning points.

Preferably, the step of determining height information of the to-be-positioned point according to the reflected light beam reflected by to-be-positioned point or the reflected light beams reflected by the auxiliary positioning points includes:

judging whether the reflected light beam reflected by the to-be-positioned point is valid or not;

if the reflected light beam reflected by the to-be-positioned point is valid, determining the height information of the to-be-positioned point according to the reflected light beam reflected by the to-be-positioned point; and if the reflected light beam reflected by the to-be-positioned point is invalid, determining the height information of the to-be-positioned point according to the reflected light beams reflected by the auxiliary positioning points.

Preferably, the step of judging whether the reflected light beam reflected by the to-be-positioned point is valid or not includes:

setting a valid position range;

receiving a projecting position of the reflected light beam reflected by the to-be-positioned point and judging whether the projecting position is in the valid position range or not;

if the projecting position of the reflected light beam reflected by the to-be-positioned point is in the valid position range, determining that the reflected light beam in valid; and if the projecting position of the reflected light beam reflected by the to-be-positioned point is not in the valid position range, determining that the reflected light beam is invalid.

Preferably, the step of determining the height information of the to-be-positioned point according to the reflected light beams reflected by the auxiliary positioning points includes:

determining the height information of the to-be-positioned point according to valid reflected light beams reflected by the auxiliary positioning points.

Preferably, the step of determining height information of the to-be-positioned point according to the reflected light beam reflected by the to-be-positioned point includes:

recording a projecting position of the reflected light beam reflected by the to-be-positioned point; and determining the height information of the to-be-positioned point according to the projecting position.

Preferably, the step of determining the height information of the to-be-positioned point according to the reflected light beams reflected by the auxiliary positioning points includes:

recording projecting positions of the reflected light beams reflected by the auxiliary positioning points; and determining the height information of the to-be-positioned point according to the projecting position.

Preferably, the positioning method further includes the following step before the step of emitting light beams to a to-be-positioned point and a number of auxiliary positioning points:

determining the to-be-positioned point; and determining the number of auxiliary positioning points symmetrically arranged about the to-be-positioned point with the to-be-positioned point as the center thereof.

The positioning device provided in the present disclosure includes:

an emitter for emitting light beams to a to-be-positioned point and a number of auxiliary positioning points;

a receiver for receiving reflected light beams of the light beams emitted from the emitter reflected by the to-be-positioned point and the auxiliary positioning points;

a judging module for judging whether the reflected light beam reflected by the to-be-positioned point is received or not; and a calculating module for receiving a judging result from the judging module; if the judging result indicates that the reflected light beam reflected by the to-be-positioned point is received, the calculating module determining height information of the to-be-positioned according to the reflected light beam reflected by the to-be-positioned point or the reflected light beams reflected by the auxiliary positioning points; if the judging result indicates that the reflected light beam reflected by the to-be-positioned point is not received, the calculating module determining the height information of the to-be-positioned point according to the reflected light beams reflected by the auxiliary positioning points.

Preferably, the receiver has a valid position range; if the reflected light beam reflected by the to-be-positioned point or the corresponding auxiliary positioning point is in the valid position range, the judging module determines that the reflected light beam reflected by the to-be-positioned point or the corresponding auxiliary positioning point is valid; if the reflected light beam reflected by the to-be-positioned point or the corresponding auxiliary positioning point is not in the valid position range, the judging module determines that the reflected light beam reflected by the to-be-positioned point or the corresponding auxiliary positioning point is invalid.

Preferably, the judging module is further used for judging whether the reflected light beam reflected by the to-be-positioned point received by the receiver is valid or not, and transmitting a judging result to the calculating module; if the judging result indicates that the reflected light beam reflected by the to-be-positioned point is valid, the calculating module determines the height information of the to-be-positioned according to the reflected light beam reflected by the to-be-positioned point; if the judging result indicates that the reflected light beam reflected by the to-be-positioned point is invalid, the calculating module determines the height information of the to-be-positioned point according to the reflected light beams reflected by the auxiliary positioning points.

Preferably, the judging module is further used for determining whether the reflected light beams reflected by the auxiliary positioning points are valid or not, and transmitting a judging result to the calculating module; the calculating module chooses the valid reflected light beams reflected by the auxiliary positioning points to determine the height information of the to-be-positioned point when determining the height information of the to-be-positioned point according to the reflected light beams reflected by the auxiliary positioning points.

Preferably, the receiver is further used for recording projecting positions of reflected light beams reflected by the to-be-positioned point and the auxiliary positioning points on the receiver, and the calculating module determines height information of the to-be-positioned point according to the projecting positions.

Preferably, the positioning device further includes a determining module for determining the to-be-positioned point and the auxiliary positioning points, and the auxiliary positioning points are symmetrically arranged about the to-be-positioned point with the to-be-positioned as the center thereof.

In the positioning method and positioning device provided in the present disclosure, by pre-determining the to-be-positioned point and the auxiliary positioning points, the height information of the to-be-positioned point can be determined according to the reflected light beams reflected by the auxiliary positioning points when the reflected light beams reflected by the to-be-positioned point is invalid or is not received, which improves the success rate of the positioning.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
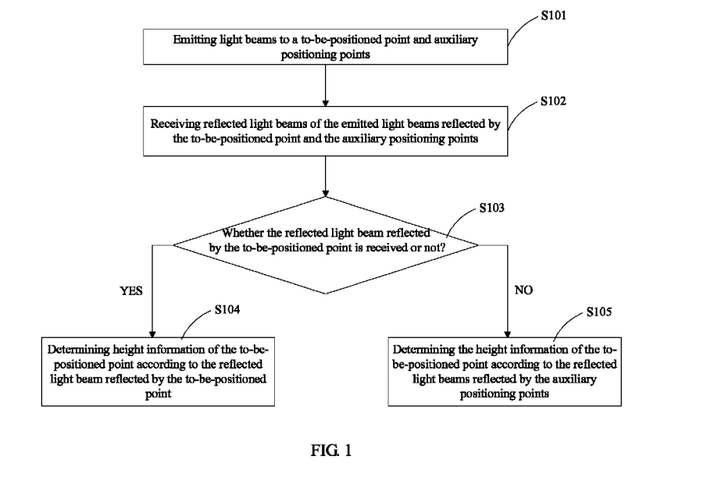
FIG. 1 is a flow chart of a positioning method in accordance with a first embodiment of the present disclosure.

Referring to FIG. 1, a positioning method in accordance with a first embodiment is provided for positioning at least one to-be-measured point when the substrate is measured. The positioning method includes the following steps.

Step S101, emitting light beams to a to-be-positioned point and auxiliary positioning points.

Figure 2:
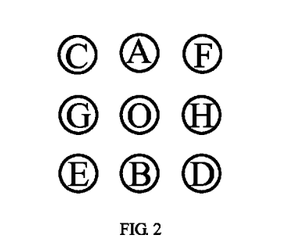
FIG. 2 is a schematic view showing the arrangement of a to-be-positioned point and auxiliary positioning points.
Figure 3:
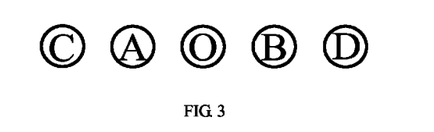
FIG. 3 is a schematic view showing another arrangement of the to-be-positioned point and the auxiliary positioning points.

Taking an array substrate as an example, when the array substrate is measured, the to-be-measured points are determined. Each to-be-measured point is at first positioned before being measured. During the positioning of the to-be-measured point, the to-be-measured point is the to-be-positioned point. A number of auxiliary positioning points around the to-be-positioned point are determined. Preferably, the auxiliary positioning points can be arranged around the to-be-positioned point with the to-be-positioned point as the center thereof. The auxiliary positioning points are symmetrically about the to-be-positioned point and are arranged as a symmetrical geometrical figure such as a rectangular or a circle with the to-be-positioned point as the geometrical center. As shown in FIG. 2, the to-be-positioned point O is located at the geometrical center of the rectangular, and the auxiliary positioning points A, B, C, D, E, F, G, and H are arranged around the to-be-positioned point O being symmetrical about the to-be-positioned point O. It is noted that the auxiliary positioning points and the to-be-positioned point may be arranged in a straight line with the auxiliary positioning points symmetrically located at two sides of the to-be-positioned point. As shown in FIG. 3, the to-be-positioned point O is located at the center of the straight line, and the auxiliary positioning points A, B, C, and D are respectively arranged at two sides of the to-be-positioned point O being symmetrical about the to-be-positioned point O. The greater the number of the auxiliary positioning points is, the higher the success rate of the positioning is, and the more accurate the positioning is.

After the to-be-positioned point and the auxiliary positioning points are determined, light beams are emitted to the determined to-be-positioned point and the auxiliary positioning points.

Step S102, receiving reflected light beams of the emitted light beams reflected by the to-be-positioned point and the auxiliary positioning points.

In the step S102, the emitted light beams are reflected by the to-be-positioned point and the auxiliary positioning points after radiating the to-be-positioned point and the auxiliary positioning points to form the reflected light beams. The reflected light beams reflected by the to-be-positioned point and the auxiliary positioning points are received and projecting positions of the reflected light beams on a receiver are recorded.

Step S103, judging whether the reflected light beam reflected by the to-be-positioned point is received or not.

The surface of the array substrate is rough and sometimes there are various kinds of impurities on the surface of the array substrate. If the areas of the surface corresponding to the to-be-positioned point and the auxiliary positioning points are rough or have impurities covered thereon, the light beams emitted to the to-be-positioned point and the auxiliary positioning points are scattered, making the reflected light beams be not within the receiving range of the receiver and preventing the receiver from receiving the reflected light beam reflected by the to-be-positioned point or each auxiliary positioning point. If the projecting position of the reflected light beam reflected by the to-be-positioned point is not in the recorded projecting positions of the reflected light beams recorded in step S102, the reflected light beam reflected by the to-be-positioned point is not received. At this time, whether the reflected light beam reflected by the to-be-positioned point is received or not is judge, step S104 is performed is the reflected light beam is received, otherwise step S105 is performed.

Step S104, determining height information of the to-be-positioned point according to the reflected light beam reflected by the to-be-positioned point.

If the projecting position of the reflected light beam reflected by the to-be-positioned point is received, the height of the to-be-positioned point can be determined according to the projecting position of the reflected light beam reflected by the to-be-positioned point. For example, if the projecting position of the reflected light beam reflected by the to-be-positioned point on the receiver is deviated upwards from the center of the receiver for about 1 unit, the height of the to-be-positioned point is determined to be 1 directly. At this situation, in the following measuring process of the to-be-positioned point, the array substrate is moved downwards for about 1 unit. If the projecting position of the reflected light beam reflected by the to-be-positioned point on the receiver is deviated downwards from the center of the receiver for about 3 units, the height of the to-be-positioned point is determined to be −3. At this situation, in the following measuring process of the to-be-positioned point, the array substrate is moved upwards for about 3 units. If the projecting position of the reflected light beam reflected by the to-be-positioned point is located at the center of the receiver, the height of the to-be-positioned point is determined to be 0, thus, the measurement of the to-be-positioned point can be carried out directly.

It is noted that even if the projecting position of the reflected light beam reflected by the to-be-positioned point is not received, the height of the to-be-positioned point can be calculated indirectly according to the projecting positions of the reflected light beams reflected by the auxiliary positioning points. Or, the height of the to-be-positioned point can be at first directly determined according to the projecting position of the reflected light beam reflected by the to-be-positioned point, then the height of the to-be-positioned point can be indirectly determined according to the projecting positions of the reflected light beams reflected by the auxiliary positioning points; after that, the difference between two calculated heights can be compared to verify the accuracy of the positioning method, which can be the reference of the three sigma variances in the following measuring process. The method of indirectly determining the height of the to-be-positioned point according to the reflected light beams reflected by the auxiliary positioning points is given in detail in the following steps.

Step S105, determining the height information of the to-be-positioned point according to the reflected light beams reflected by the auxiliary positioning points.

If the reflected light beam reflected by the to-be-positioned point is not received by the receiver due to the rough surface of the to-be-positioned point or the impurities, the height information of the to-be-positioned point can be determined according to the positions of the reflected light beams on the receiver reflected by the auxiliary positioning points.

Figure 4:
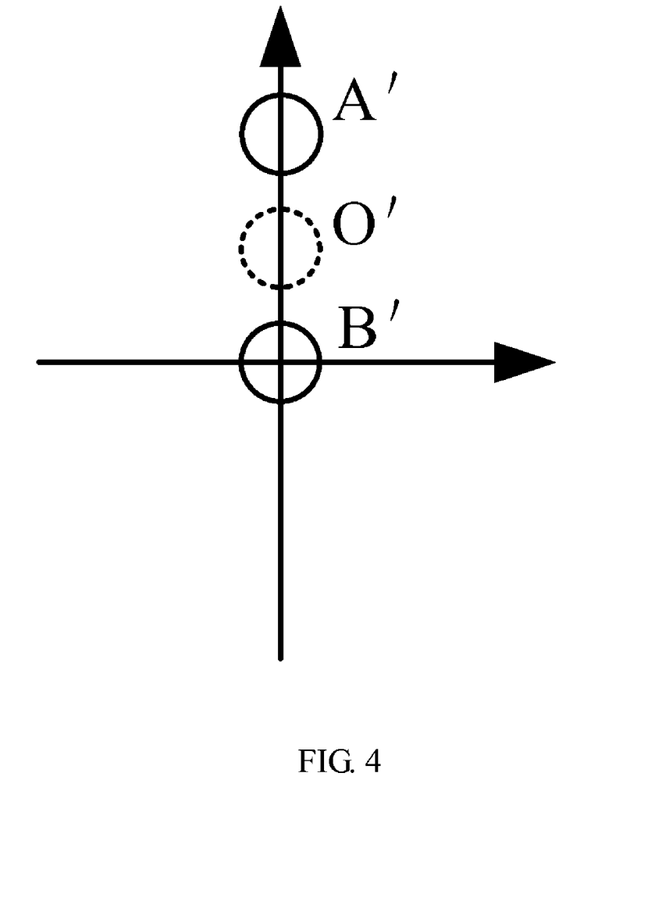
FIG. 4 is a schematic view showing that reflected light beams reflected by the auxiliary positioning points are projected to a positioning member.

For example, as shown in FIG. 4, a schematic view showing the reflected light beams reflected by the auxiliary positioning points are projected to the receiver is provided with the origin of coordinate being the center of the receiver. The receiver receives the reflected light beams reflected by two auxiliary positioning points A and B respectively symmetrically located at two sides of a to-be-positioned point O. If the projecting position A' of the reflected light beam reflected by the point A on the receiver is deviated upwards from the center of the receiver for about 4 units and the projecting position B' of the reflected light beam reflected by the point B on the receiver is located at the center of the receiver, since the auxiliary positioning points A and B are symmetrically arranged at two sides of the to-be-positioned point O, thus, the projecting point O' (as the dotted line shown in FIG. 4) of the reflected light beam reflected by the to-be-positioned point O on the receiver should be located between the projecting positions A' and B' if the to-be-positioned point O reflects the light beam normally. At this situation, the height of the to-be-positioned point is determined to be (4+0)/2=2. Similarly, if the projecting position of the reflected light beam reflected by the point A on the receiver is deviated upward from the center point for 3 units and the projecting position of the reflected light beam reflected by the point B on the receiver is deviated downwards for 1 unit, the height of the to-be-positioned point is determined to be (3−1)/2=1.

It is noted that the receiver may not receive the reflected light beams reflected by the auxiliary positioning points due to the rough surface of the auxiliary positioning points or the impurities on the auxiliary positioning points, thus, the greater the number of the selected auxiliary positioning points is, the higher the success rate of the positioning is. At the same time, the height of the to-be-positioned point can be respectively determined by the reflected light beams reflected by a number of pairs of auxiliary positioning points. If there are differences between the obtained data, the data can be averaged to obtain a more accurate height of the to-be-positioned point to improve the accuracy of the positioning.

Therefore, by pre-determining the to-be-positioned point and the auxiliary positioning points, the height of the to-be-positioned point can be determined according to the reflected light beams reflected by the auxiliary positioning points when the reflected light beam reflected by the to-be-positioned point cannot be received, which improves the success rate of the positioning.

Figure 5:
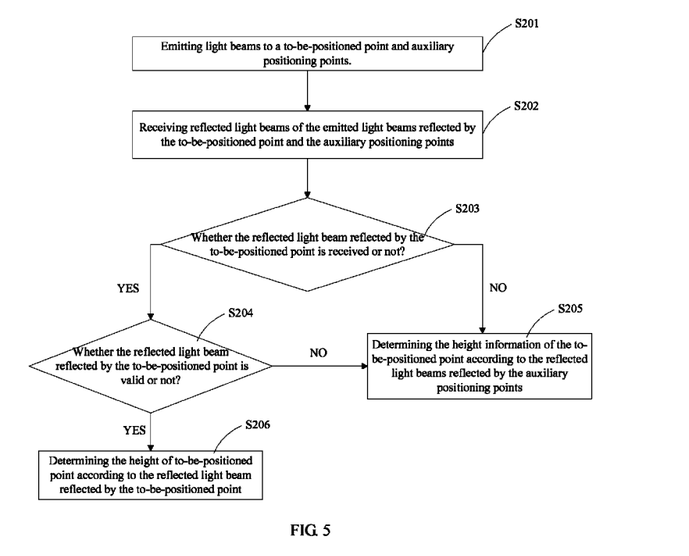
FIG. 5 is a flow chart of a positioning method in accordance with a second embodiment.

Referring to FIG. 5, a positioning method in accordance with a second embodiment is provided. The positioning method includes the following steps.

Step S201, emitting light beams to a to-be-positioned point and auxiliary positioning points.

Taking an array substrate as an example, when the array substrate is measured, a to-be-measured point is predetermined. Each to-be-measured point is positioned before being measured. In the positioning of the to-be-measured point, the to-be-measured point is the to-be-positioned point, and the auxiliary positioning points around the to-be-position point are determined. Preferably, the auxiliary positioning points can be arranged around the to-be-positioned point with the to-be-positioned point as the center thereof. The auxiliary positioning points are symmetrically about the to-be-positioned point and are arranged as a symmetrical geometrical figure such as a rectangular or a circle with the to-be-positioned point as the geometrical center. As shown in FIG. 2, the to-be-positioned point O is located at the geometrical center of the rectangular, and the auxiliary positioning points A, B, C, D, E, F, G, and H are arranged around the to-be-positioned point O being symmetrical about the to-be-positioned point O. It is noted that the auxiliary positioning points and the to-be-positioned points may be arranged in a straight line with the auxiliary positioning points symmetrically located at two sides of the to-be-positioned point. As shown in FIG. 3, the to-be-positioned point O is located at the center of the straight line, and the auxiliary positioning points A, B, C, and D are respectively arranged at two sides of the to-be-positioned point O being symmetrical about the to-be-positioned point O. The greater the number of the auxiliary positioning points is, the higher the success rate of the positioning is, and the more accurate the positioning is.

After the to-be-positioned point and the auxiliary positioning points are determined, a positioning device is used to emit light beams to the to-be-positioned point and the auxiliary positioning points.

Step S202, receiving reflected light beams of the emitted light beams reflected by the to-be-positioned point and the auxiliary positioning points.

In the step S202, the emitted light beams are reflected by the to-be-positioned point and the auxiliary positioning points after radiating the to-be-positioned point and the auxiliary positioning points to form the reflected light beams. The reflected light beams reflected by the to-be-positioned point and the auxiliary positioning points are received and projecting positions of the reflected light beams on a receiver are recorded.

Step S203, judging whether the reflected light beam reflected by the to-be-positioned point is received or not.

The surface of the array substrate is rough and there are various kinds of impurities on the surface of the array substrate. If the areas of the surface corresponding to the to-be-positioned point and the auxiliary positioning points are rough or have impurities covered thereon, the light beams radiating the to-be-positioned point and the auxiliary positioning points are scattered, making the reflected light beams be not within the receiving range of the receiver and preventing the receiver from receiving the reflected light beam reflected by the to-be-positioned point or each auxiliary positioning point. If the position of the reflected light beam reflected by the to-be-positioned point is not in the positions of the reflected light beams on the receiver recorded in step S202, the reflected light beam reflected by the to-be-positioned point is not received. Whether the reflected light beam reflected by the to-be-positioned point is received or not is judged. If the reflected light beam is received, step S204 is performed, otherwise step S205 is performed.

Step S204, judging whether the reflected light beam reflected by the to-be-positioned point is valid or not.

In the embodiment, a valid position range is set. Receiving the projecting positions of the reflected light beams reflected by the to-be-positioned point and the auxiliary positioning points on the receiver, and then judging whether the positions are in the valid position range or not. If the projecting position of reflected light beam reflected by the to-be-positioned point is in the valid position range, determining that the reflected light beam is valid, thus, the height information of the to-be-positioned point determined according to the position of the valid reflected light beam is of relatively higher accuracy; if the projecting position of the reflected light beam reflected by the to-be-positioned point is not in the valid position range, determining that the reflected light beam is invalid, thus, the height of the to-be-positioned point determined according to the invalid reflected light beam is of relatively lower accuracy. Therefore, in order to improve the accuracy of the positioning, after the projecting position of the reflected light beam reflected by the to-be-positioned point is received, whether the reflected light beam is valid or not is judges. If the reflected light beam is valid, step S205 is performed, otherwise step S206 is performed.

Step S205, determining the height information of the to-be-positioned point according to the reflected light beams reflected by the auxiliary positioning points.

It is noted that even if the position of the reflected light beam reflected by the to-be-positioned point cannot be received, or even if the received reflected light beam reflected by the to-be-positioned point is determined to be invalid, the height information of the to-be-positioned point can still be determined according to the projecting positions of the reflected light beams reflected by the auxiliary positioning points For example, as shown in FIG. 4, a schematic view showing the reflected light beams reflected by the auxiliary positioning points are projected to the receiver is provided with the origin of coordinate being the center of the receiver. The receiver receives the reflected light beams reflected by two auxiliary positioning points A and B respectively symmetrically located at two sides of a to-be-positioned point O. If the projecting position A' of the reflected light beam reflected by the point A on the receiver is deviated upwards from the center of the receiver for 4 units and the projecting position B' of the reflected light beam reflected by the point B on the receiver is located at the center of the receiver, since the auxiliary positioning points A and B are symmetrically arranged at two sides of the to-be-positioned point O, thus, the projecting point O' (as the dotted line shown in FIG. 4) of the reflected light beam reflected by the to-be-positioned point O on the receiver should be located between the projecting positions A' and B' if the to-be-positioned point O reflects the light beam normally. At this situation, the height of the to-be-positioned point is $(4+0)/2=2$. Similarly, if the reflected light beam reflected by the point A on the receiver is deviated upward from the center point for 3 units and the reflected light beam reflected by the point B on the receiver is deviated downwards for 1 unit, the height of the to-be-positioned point is $(3-1)/2=1$.

It is noted that the receiver may not receive the reflected light beams reflected by the auxiliary positioning point(s) due to the rough surface of the auxiliary positioning points or the impurities on the auxiliary positioning points, thus, the greater the number of the selected auxiliary positioning points is, the higher the success rate of the positioning is. At the same time, the height of the to-be-positioned point can be determined according to the reflected light beams reflected by a number of pairs of auxiliary positioning points. When there are differences between the obtained data, the data can be averaged to obtain a more accurate height of the to-be-positioned point to improve the accuracy of the positioning.

Additionally, to the step S205, in order to guarantee the accuracy of the positioning, the reflected light beams reflected by the auxiliary positioning points with the projecting positions thereof in the valid receiving range of the receiver can be chosen, and the height of to-be-positioned point can be determined according to the projecting positions of the valid reflected light beams on the receiver.

Step S206, determining the height of to-be-positioned point according to the reflected light beam reflected by the to-be-positioned point.

If the valid reflected light beam reflected by the to-be-positioned point is received, that is, the reflected light beam reflected by the to-be-positioned point is in the valid receiving range of the receiver, the height of the to-be-positioned point can be determined according to the projecting position of the reflected light beam reflected by the to-be-positioned point. For example, if the projecting position of the reflected light beam reflected by the to-be-positioned point on the receiver is deviated upwards from the center of the receiver for 1 unit, then the height of the to-be-positioned point is determined to be 1, at this situation, the array substrate is moved downwards for 1 unit in the following measuring process of the to-be-positioned point; if the projecting position of the reflected light beam reflected by the to-be-positioned point on the receiver is deviated downwards from the center of the receiver for 3 units, then the height of the to-be-positioned point is determined to be −3, at this situation, the array substrate is moved upwards for about 3 units in the following measuring process of the to-be-positioned point; if the reflected light beam reflected by the to-be-positioned point is located at the center of the receiver when being projected to the receiver, the height of the to-be-positioned point is determined to be 0 and the measurement of the to-be-positioned point can be carried out directly.

It is noted that even if the projecting position of the reflected light beam reflected by the to-be-positioned point is be received, the height of the to-be-positioned point can be calculated indirectly according to the projecting positions of the reflected light beams reflected by the auxiliary positioning points. Or, the height of the to-be-positioned point can be at first directly determined according to the projecting position of the reflected light beam reflected by the to-be-positioned point, and then the height of the to-be-positioned point can be indirectly determined according to the projecting positions of the reflected light beams reflected by the auxiliary positioning points, then the difference between two calculated heights can be compared to verify the accuracy of the positioning device, which can be the reference of the three sigma variances in the following measuring process.

Therefore, by judging whether the projecting positions of the reflected light beams are valid or not and determining the height of the to-be-positioned point according to the reflected light beams with the projecting positions thereof in the valid position range, the accuracy of the positioning can be improved.

Figure 6:
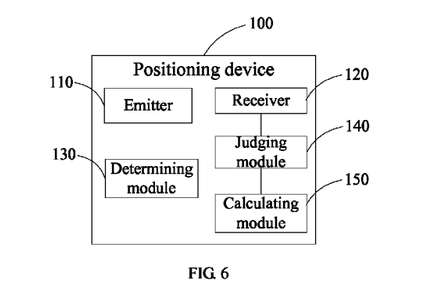
FIG. 6 is a schematic view of a positioning device in accordance with an embodiment of the present disclosure.

Referring to FIG. 6, a positioning device in accordance with an embodiment of the present disclosure is provided. The positioning device is used for positioning a to-be-measured point when the array substrate is measured. The positioning device 100 includes an emitter 110, a receiver 120, a determining module 130, a judging module 140, and a calculating module 150.

The determining module 130 is used for determining a to-be-positioned point needed to be positioned on the array substrate and determining a number of auxiliary positioning points according to the to-be-positioned position. The auxiliary positioning points are arranged around the to-be-positioned point with the to-be-positioned point as the center thereof. Preferably, the auxiliary positioning points can be arranged around the to-be-positioned point with the to-be-positioned point as the center thereof. The auxiliary positioning points are symmetrically about the to-be-positioned point and are arranged as a symmetrical geometrical figure such as a rectangular or a circle with the to-be-positioned point as the geometrical center. As shown in FIG. 2, the to-be-positioned point O is located at the geometrical center of the rectangular, and the auxiliary positioning points A, B, C, D, E, F, G, and H are arranged around the to-be-positioned point O being symmetrical about the to-be-positioned point O. It is noted that the auxiliary positioning points and the to-be-positioned points may be arranged in a straight line with the auxiliary positioning points symmetrically located at two sides of the to-be-positioned point. As shown in FIG. 3, the to-be-positioned point O is located at the center of the straight line, and the auxiliary positioning points A, B, C, and D are respectively arranged at two sides of the to-be-positioned point O being symmetrical about the to-be-positioned point O. The greater the number of the auxiliary positioning points is, the higher the success rate of the positioning of the to-be-measured point is, and the more accurate the positioning of the to-be-measured point is. It is noted that the process of determining the to-be-positioned point and the auxiliary positioning points can be performed manually, however, at a lower speed than be performed by the positioning device.

The emitter 110 is used for emitting light beams respectively to the predetermined to-be-positioned point and auxiliary positioning points. The emitter 110 simultaneously emits the light beams to the auxiliary positioning points arranged around the to-be-positioned point with the to-be-positioned point as the center thereof when emitting the light beam to the to-be-positioned point.

The receiver 120 is used for receiving reflected light beams of the light beams emitted from the emitter 110 which are reflected by the to-be-positioned point and the auxiliary positioning points, recording projecting positions of the reflected light beams on the receiver 130 according to the received reflected light beams, and transmitting the projecting positions to the judging module 140.

The judging module 140 is used for receiving the projecting positions of the reflected light beams and judging whether the projecting position of the reflected light beam reflected by the to-be-positioned point is in the projecting positions of the received reflected light beams or not. If yes, the judging module transmits the projecting positions of the reflected light beams reflected by the to-be-positioned point and the auxiliary positioning points to the calculating module 150, so the calculating module 150 can determine the height information of the to-be-positioned point according to the projecting position of the reflected light beam reflected by the to-be-positioned point or the projecting positions of the reflected light beams reflected by the auxiliary positioning points. Otherwise, the judging module 140 transmits the projecting positions of the reflected light beams reflected by the auxiliary positioning points to the calculating module 150, so the calculating module can determine the height of the to-be-positioned point of according to the projecting positions of the reflected light beams reflected by the auxiliary positioning points.

For example, if the projecting position of the reflected light beam reflected by the to-be-positioned point on the receiver is deviated upwards from the center of the receiver for 1 unit, the height of the to-be-positioned point is determined to be 1. If the projecting position of the reflected light beam reflected by the to-be-positioned point on the receiver is deviated downwards from the center of the receiver for 3 units, the height of the to-be-positioned point is determined to be −3. If the reflected light beam reflected by the to-be-positioned point is located at the center of the receiver when being projected to the receiver, the height of the to-be-positioned point is directly determined to be 0.

For example, as shown in FIG. 4, a schematic view showing the reflected light beams reflected by the auxiliary positioning points are projected to the receiver is provided with the origin of coordinate being the center of the receiver. The receiver receives the reflected light beams reflected by two auxiliary positioning points A and B respectively symmetrically located at two sides of a to-be-positioned point O. If the projecting points A' of the reflected light beam reflected by the point A on the receiver is deviated upwards from the center of the receiver for 4 units and the projecting point B' of the reflected light beam reflected by the point B on the receiver is located at the center of the receiver, since the auxiliary positioning points A and B are symmetrically arranged at two sides of the to-be-positioned point O, thus, the projecting point O' (as the dotted line shown in FIG. 4) of the reflected light beam reflected by the to-be-positioned point O on the receiver should be located between the projecting points A' and B' if the to-be-positioned point O reflects the light beam normally. At this situation, the height of the to-be-positioned point is (4+0)/2=2. Similarly, if projecting position of the reflected light beam reflected by the point A on the receiver is deviated upward from the center point for 3 units and the projecting position of the reflected light beam reflected by the point B on the receiver is deviated downwards for 1 unit, the height of the to-be-positioned point is (3−1)/2=1.

Therefore, the positioning device 100 of the embodiment emits the light beams to the to-be-positioned point and the auxiliary positioning points through the emitter 110, and receives the reflected light beams reflected by the to-be-positioned point and the auxiliary positioning points through the receiver 120, thus, even the receiver 120 does not receive the reflected light beam reflected by the to-be-positioned point due to the scattering of the light beams at the to-be-positioned point, the height of the to-be-positioned point can still be determined according to the projecting positions of the reflected light beams reflected by the auxiliary positioning points, which improves the success rate and efficiency of the positioning.

Furthermore, the judging module 140 further forms a valid position ranges. The judging module 140 is further used for judging whether the projecting position of the reflected light beam reflected by the to-be-positioned point is in the valid position range or not. If the projecting position of the reflected light beam is in the valid position range, the height information of the to-be-positioned point determined according to the projecting position of the reflected light beam is of relatively higher accuracy. Otherwise, if the projecting position of the reflected light beam is not in the valid position range, the height information of the to-be-positioned point determined according to the projecting position of the reflected point is of relative lower accuracy. In order improve the accuracy of the positioning, the judging module 140 is further used for judging whether the reflected light beam is valid or not by judging whether the projecting position of the received reflected light beam reflected by the to-be-positioned point is in the valid position range or not.

The judging module 140 determines that the reflected light beam reflected by the to-be-positioned point is valid after determining that the projecting position of the reflected light beam on the receiver 120 is in the valid position range, and transmits the judging result to the calculating module 150, so the calculating module 150 can determine the height information of the to-be-positioned point according to the available reflecting light beam.

The judging module 140 determines that the reflected light beam reflected by the to-be-positioned point is invalid after determining that the projecting position of the reflected light beam on the receiver 120 is not in the valid position range, and transmits the judging result to the calculating module 150, so the calculating module 150 can determine the height information of the to-be-positioned point according to the projecting positions of the reflected light beams reflected by the auxiliary positioning points.

Meanwhile, in order to guarantee the accuracy of the positioning, the judging module 140 is further used for judging whether the projecting positions of the reflected light beams reflected by the auxiliary positioning points are in the valid position range or not, and transmitting the judging result to the calculating module 150. In this way, the calculating module 150 can choose the valid reflected light beams reflected by the auxiliary positioning points when determining the height of the to-be-positioned point according to the reflected light beams reflected by the auxiliary positioning points, that is, choose the projecting positions of the reflected light beam sin the valid position range to determine the height information of to-be-positioned point.

For example, the receiver 120 receives the reflected light beams reflected by two pairs of auxiliary positioning points, including a pair of points containing point C and point D and another pair of points containing point E and point F. The reflected light beam reflected by the point C is deviated upwards for 3 units from the center of the receiver when being projected to the receiver 120, the reflected light beam reflected by the point D is deviated upwards for 1 unit from the center of the receiver 120 when being projected to the receiver 120, the reflected light reflected by the point E is deviated downward for 1 unit form the center of the receiver 120 when being projected to the receiver 120, and the reflected light beam reflected by the point E is deviated upwards for 10 units from the center of the receiver 120 when being projected to the receiver 120. The projecting positions of the reflected light beams reflected by the points C, D, and E are in the valid position range of the receiver 120, while the projecting information of the reflected light beam reflected by the point F is not in the valid position range of the receiver 120, thus, the height of the to-be-positioned point can be determined by the reflected light beams reflected by the points C and D, which is (3+1)/2=2.

It is noted that the receiver may not receive the reflected light beams reflected by the auxiliary positioning point(s) due to the rough surface of the auxiliary positioning points or the impurities on the auxiliary positioning points, thus, the greater the number of the selected auxiliary positioning points is, the higher the success rate of the positioning is. At the same time, the height of the to-be-positioned point can be respectively determined by a number of pairs of reflected light beams reflected by the auxiliary positioning points. When there are differences between the obtained data, the data can be averaged to obtain a more accurate height of the to-be-positioned point to improve the accuracy of the positioning.

With the judging module 140 judging the validity of the projecting positions of the reflected light beams, the calculating module 150 can choose the reflected light beams which are projected into the valid position range to determine the height of the to-be-positioned point, which improves the accuracy of the positioning.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A positioning method, comprising:
   emitting light beams to a to-be-positioned point and a number of auxiliary positioning points;
   receiving reflected light beams of the emitted light beams reflected by the to-be-positioned point and the auxiliary positioning points;
   judging whether the reflected light beam reflected by the to-be-positioned point is received or not;
   if the reflected light beam reflected by the to-be-positioned point is received, determining height information of the to-be-positioned point according to the reflected light beam reflected by to-be-positioned point or the reflected light beams reflected by the auxiliary positioning points; and
   if the reflected light beam reflected by the to-be-positioned point is not received, determining the height information of the to-be-positioned point according to the reflected light beams reflected by the auxiliary positioning points.

2. The positioning method of claim 1, wherein the step of determining height information of the to-be-positioned point according to the reflected light beam reflected by to-be-positioned point or the reflected light beams reflected by the auxiliary positioning points comprises:
   judging whether the reflected light beam reflected by the to-be-positioned point is valid or not;
   if the reflected light beam reflected by the to-be-positioned point is valid, determining the height information of the to-be-positioned point according to the reflected light beam reflected by the to-be-positioned point; and
   if the reflected light beam reflected by the to-be-positioned point is invalid, determining the height information of the to-be-positioned point according to the reflected light beams reflected by the auxiliary positioning points.

3. The positioning method of claim 2, wherein the step of judging whether the reflected light beam reflected by the to-be-positioned point is valid or not comprises:
   setting a valid position range;
   receiving a projecting position of the reflected light beam reflected by the to-be-positioned point and judging whether the projecting position is in the valid position range or not;
   if the projecting position of the reflected light beam reflected by the to-be-positioned point is in the valid position range, determining that the reflected light beam in valid; and
   if the projecting position of the reflected light beam reflected by the to-be-positioned point is not in the valid position range, determining that the reflected light beam is invalid.

4. The positioning method of claim 2, wherein the step of determining the height information of the to-be-positioned point according to the reflected light beams reflected by the auxiliary positioning points comprises:
   determining the height information of the to-be-positioned point according to valid reflected light beams reflected by the auxiliary positioning points.

5. The positioning method of claim 1, wherein the step of determining height information of the to-be-positioned point according to the reflected light beam reflected by the to-be-positioned point comprises:
   recording a projecting position of the reflected light beam reflected by the to-be-positioned point; and
   determining the height information of the to-be-positioned point according to the projecting position.

6. The positioning method of claim 1, wherein the step of determining the height information of the to-be-positioned point according to the reflected light beams reflected by the auxiliary positioning points comprises:
   recording projecting positions of the reflected light beams reflected by the auxiliary positioning points; and
   determining the height information of the to-be-positioned point according to the projecting position.

7. The positioning method of claim 1 further comprising the following step before the step of emitting light beams to a to-be-positioned point and a number of auxiliary positioning points:
   determining the to-be-positioned point; and
   determining the number of auxiliary positioning points symmetrically arranged about the to-be-positioned point with the to-be-positioned point as the center thereof.

8. A positioning device, comprising:
   an emitter for emitting light beams to a to-be-positioned point and a number of auxiliary positioning points;
   a receiver for receiving reflected light beams of the light beams emitted from the emitter reflected by the to-be-positioned point and the auxiliary positioning points;
   a judging module for judging whether the reflected light beam reflected by the to-be-positioned point is received or not; and
   a calculating module for receiving a judging result from the judging module; if the judging result indicates that the reflected light beam reflected by the to-be-positioned point is received, the calculating module determining height information of the to-be-positioned according to the reflected light beam reflected by the to-be-positioned point or the reflected light beams reflected by the auxiliary positioning points; if the judging result indicates that the reflected light beam reflected by the to-be-positioned point is not received, the calculating module determining the height information of the to-be-positioned point according to the reflected light beams reflected by the auxiliary positioning points.

9. The positioning device of claim 8, wherein the receiver has a valid position range; if the reflected light beam reflected by the to-be-positioned point or the corresponding auxiliary positioning point is in the valid position range, the judging module determines that the reflected light beam reflected by the to-be-positioned point or the corresponding auxiliary positioning point is valid; if the reflected light beam reflected by the to-be-positioned point or the corresponding auxiliary positioning point is not in the valid position range, the judging module determines that the reflected light beam reflected by the to-be-positioned point or the corresponding auxiliary positioning point is invalid.

10. The positioning device of claim 8, wherein the judging module is further used for judging whether the reflected light beam reflected by the to-be-positioned point received by the receiver is valid or not, and transmitting a judging result to the calculating module; if the judging result indicates that the reflected light beam reflected by the to-be-positioned point is valid, the calculating module determines the height information of the to-be-positioned according to the reflected light beam reflected by the to-be-positioned point; if the judging result indicates that the reflected light beam reflected by the to-be-positioned point is invalid, the calculating module determines the height information of the to-be-positioned point according to the reflected light beams reflected by the auxiliary positioning points.

11. The positioning device of claim 8, wherein the judging module is further used for determining whether the reflected light beams reflected by the auxiliary positioning points are valid or not, and transmitting a judging result to the calculating module; the calculating module chooses the valid reflected light beams reflected by the auxiliary positioning points to determine the height information of the to-be-positioned point when determining the height information of the to-be-positioned point according to the reflected light beams reflected by the auxiliary positioning points.

12. The positioning device of claim 8, wherein the receiver is further used for recording projecting positions of reflected light beams reflected by the to-be-positioned point and the auxiliary positioning points on the receiver, and the calculating module determines height information of the to-be-positioned point according to the projecting positions.

13. The positioning device of claim 8 further comprising a determining module for determining the to-be-positioned point and the auxiliary positioning points, and the auxiliary positioning points are symmetrically arranged about the to-be-positioned point with the to-be-positioned as the center thereof.

* * * * *